United States Patent [19]

Kalet et al.

[11] 3,810,021

[45] May 7, 1974

[54] INBAND GENERATION OF DIGITAL SIGNALING WAVEFORMS

[75] Inventors: Irving Kalet, Haifa, Israel; Stephen Brant Weinstein, Holmdel, N.J.

[73] Assignee: Bell Telephone Laboratories Incorporated, Murray Hill, N.J.

[22] Filed: June 16, 1972

[21] Appl. No.: 263,642

[52] U.S. Cl. .................... 325/141, 325/137, 178/67

[51] Int. Cl. ............................................ H04b 1/04

[58] Field of Search ........... 178/67; 325/30, 42, 49, 325/50, 60, 136–138, 141, 143, 163; 333/17, 18, 28 R, 70 T; 179/15 BS, 15 AA, 15 A, 15 BY, 15 FS, 1 D, 1 SA

[56] References Cited

UNITED STATES PATENTS

| | | | |
|---|---|---|---|
| 2,414,265 | 1/1947 | Lawson | 179/15 A |
| 3,233,043 | 2/1966 | Shimasaki | 179/15 A |
| 3,524,023 | 7/1966 | Whang | 178/67 |
| 3,123,670 | 3/1964 | Kaenel | 325/60 |
| 3,292,110 | 12/1966 | Becker et al. | 333/70 T |

OTHER PUBLICATIONS

Van Gerwen et al., Data Modems etc., IEEE.

*Primary Examiner*—Albert J. Mayer
*Attorney, Agent, or Firm*—J. P. Kearns, Jr.

[57] ABSTRACT

Analog waveforms are directly and continuously generated in a desired transmission passband from baseband digital data signals without a separate frequency translation operation by exciting bandpass filters from a train of data pulses. Conventionally, direct inband signal generation is restricted to cases where the passband carrier frequency, whether explicit or implicit, e.g., the carrier frequency in a single-sideband modulation system, is an integral multiple of the data rate. This constraint can be liberalized to permit the ratio of carrier frequency to data rate to be a rational fraction when a finite number of fixed filters with selected phase characteristics are cyclically pulsed. Such fixed filters can advantageously take the form of a single transversal filter with cyclically adjustable tap weights.

6 Claims, 5 Drawing Figures

INBAND GENERATION OF DIGITAL SIGNALING WAVEFORMS

FIELD OF THE INVENTION

This invention relates to the direct inband generation of digital signaling waveforms in bandlimited transmission channels.

BACKGROUND OF THE INVENTION

A basic operation in data transmission and other digital signaling systems is the conversion of discrete symbols into analog waveforms which match the spectra of available bandlimited transmission channels. The widely available telephone voice channel, for example, is generally bandlimited within the range of about 300 to 3,000 Hz. Baseband digital data symbols generally include significant energy both within and outside this range. Conventional amplitude modulation techniques employ frequency translation from baseband, equivalent to modulation on a 0-Hz carrier, to a single-sided passband with a carrier at or near the bandedge, e.g., in the vicinity of 3,000 Hz.

It is a primary object of this invention to generate continuous analog waveforms directly from data pulse signals within prescribed bandwidth limits without resorting to conventional amplitude modulation techniques.

It is another object of this invention to generate from data pulse signals a group of analog waveforms within a prescribed bandwidth which are compatible in phase where the ratio of a selected frequency in the bandwidth is other than an integral multiple of the synchronous data pulse rate.

It is a further object of this invention to generate from data pulse signals a group of compatible analog waveforms using a finite number of fixed filters, such finite number being reducible to one.

SUMMARY OF THE INVENTION

According to this invention, a plurality of consecutive analog waveforms are directly generated in a predetermined bandlimited signaling channel from synchronous digital data pulses without undergoing conventional frequency translation and sharp filtering operations; provided only that the ratio between a frequency within the predetermined bandwidth, which is equivalent to the implicit or explicit carrier frequency in the corresponding single-or vestigial-sideband modulated signal spectrum, and the data signaling rate is a rational fraction, i.e., a fraction whose numerator and denominator are integers relatively prime to each other.

In one illustrative embodiment of this invention a plurality of fixed filters having a common amplitude shaping but differing in epochal phase characteristic are pulsed sequentially and cyclically by consecutive data pulses to form a continuous analog signal within a predetermined passband. The number of fixed filters required is equal to the denominator of the rational fraction defined above. Where the denominator is an even number, only half that number is actually required since the phase characteristics of one half are the inverse of those of the other half. The fixed filters can be implemented in frequency- or time-domain form.

In another illustrative embodiment of this invention a single filter in transversal form with a plurality of cyclically and sequentially selectable tap gain coefficients is pulsed continuously by consecutive data pulses to form a continuous analog signal within a predetermined passband. The number of sets of tap gain coefficients required is equal to the denominator of the rational fraction defined above. Where the denominator is an even number, half the coefficients differ from the other half only in algebraic sign.

The signal spectrum generated according to this invention from the transversal filter is periodic. In such case, a simple low-pass filter is generally required to separate the desired bandwidth from the remainder of the spectrum, unless the transmission channel is itself inherently bandlimited.

DESCRIPTION OF THE DRAWING

The above and other objects and features of this invention will be appreciated from a consideration of the following detailed description and the drawing in which.

DETAILED DESCRIPTION

Figure 1:
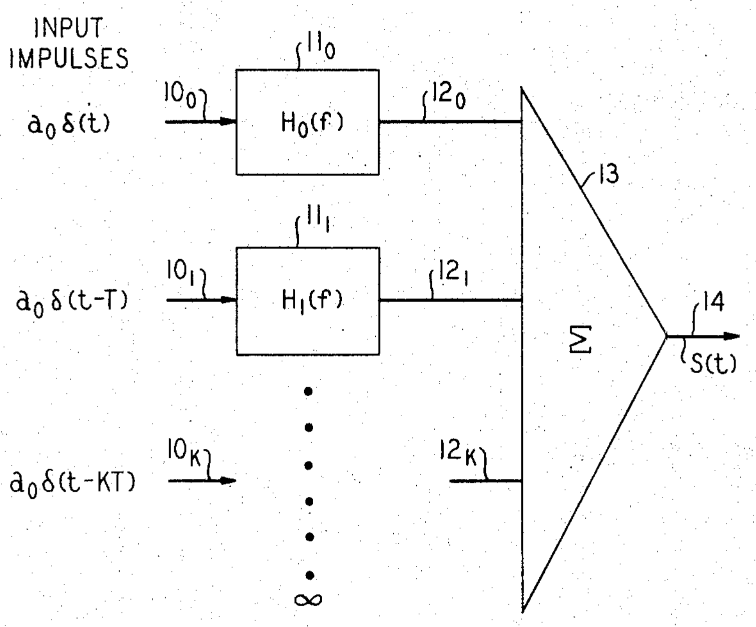
FIG. 1 is a block diagram of an infinite parallel array of filters required to produce a single-sideband data channel signal when the ratio between carrier frequency and data transmission rate is arbitrary.

When a baseband digital data stream composed of synchronously generated elements $a_0, a_1, a_2, \ldots$ is applied to a fixed filter which generates a waveform $g(t)$, the resultant pulse train $d(t)$ can be defined as $$d(t) = \sum_n a_n g(t - nT), \qquad (1)$$

where

T is the synchronous signaling interval and $n$ is a series of integers.

A lower sideband signal can be derived conventionally from the pulse train of equation (1) and modulated onto a carrier frequency $f_c$ by multiplying pulse train $d(t)$ by the carrier waveform $\cos(2\pi f_c t)$ and filtering out the upper sideband. This channel signal $s(t)$ is represented as $$s(t) = d(t)\cos(2\pi f_c t) + \hat{d}(t)\sin(2\pi f_c t), \qquad 2.$$

where $\hat{d}(t)$ is the Hilbert transform, equivalent to rotating all frequency components through a 90° angle, of the baseband signal $d(t)$.

The baseband data train can be recovered from a received signal defined by equation (2) by passing the product $s(t)\cos(2\pi f_c t)$ through a low-pass filter.

The Fourier transform of equation (2) into the frequency domain is $$S(f)=\begin{cases} D(f-f_c)+D(f+f_c), & |f| \leqq f_c \\ 0, & |f| > f_c. \end{cases} \quad (3)$$

$D(f)$ in equation (3) is given by $$D(f)=\sum_n a_n e^{-j2\pi fnT} G(f), \quad (4)$$

where $G(f)$ is the Fourier transform of the baseband pulse $g(t)$.

The pulse g(t) takes on a known set of amplitude values at T-second sampling times. The Class IV partial-response pulse, for example, as described in U. S. Pat. No. 3,388,330 issued on June 11, 1968 to E. R. Kretzmer, passes through a unit positive amplitude at $t = T/2$ and a unit negative amplitude at $t = -T/2$ and is zero at all other T-second sampling times.

Equation (3) with the use of equation (4) can be rewritten as $$S(f)=\begin{cases} \sum_n a_n e^{-j2\pi nfT}[e^{j2\pi nf_cT}G(f-f_c) + e^{-j2\pi nf_cT}G(f+f_c)], & |f| \leqq f_c \\ 0, & |f| > f_c \end{cases} \quad (5)$$

When a filter whose transfer function can be represented as $$H_n(f)=\begin{cases} e^{j2\pi nf_cT}G(f-f_c) + e^{-j2\pi nf_cT}G(f+f_c), & |f| \leqq f_c \\ 0, & |f| > f_c \end{cases} \quad (6)$$

is excited by an impulse $a_n\ \delta(t-nT)$, the spectrum of the output is the nth term in equation (5). An infinite bank of filters 11, as diagrammed in FIG. 1, each excited in turn by a set of time waveforms $\{a_n\ \delta(t-nT)\}$, is required to implement equation (5). The input signals as indicated in FIG. 1 are applied on input leads $\mathbf{10}_0$, $\mathbf{10}_1$, and so forth to respective filters $\mathbf{11}_0$, $\mathbf{11}_1$, and so forth whose transfer functions are $H_0(f)$, $H_1(f)$, and so forth. The consecutive outputs on leads $\mathbf{12}_0$, $\mathbf{12}_1$, and so forth are combined in adder 13 to form a continuous line signal $s(t)$ on output lead 14. Since there is an infinite number of filters, each one is used only once and discarded, an obvious impracticality.

However, if the carrier frequency $f_c$ in the above equations is an integral multiple of the synchronous data rate $f_s = 1/T$, that is to say, $$f_c = mf_s = m/T \quad 7.$$

where $m$ is an integer, then $H_n(f)$ of equation (6) simplifies to $$H_n(f)=\begin{cases} G(f-f_c)+G(f+f_c), & |f| \leqq f_c \\ 0, & |f| > f_c \end{cases} \quad (8)$$

Equation (8) is independent of $n$ and a single one of the filters 11 in FIG. 1 excited by the data sequence $\{a_n\ \delta(t-nT)\}$ suffices to generate the desired channel signal.

According to this invention, the constant $m$ in equation (7) is changed from an integer to a rational fraction $r/s$, where $r$ and $s$ are integers relatively prime to each other. Then, equation (7) takes the form $$f_cT = f_c/f_s = r/s, \quad 9.$$

where $f_s$ is the signaling rate or $1/T$.

Furthermore, in equation (6) $e^{j2\pi nf_cT} = e^{j2\pi nr/s}$. 10.

Equation (10) is periodic in $n$ and the period is $s$, which is to say that the phase terms in equation (6) take on only $s$ distinct values. Thus, the infinite sequence of filters $\{H_n(f)$ implied by equation (6) is reduced to $s$ distinct filters only. These individual filters are then periodically pulsed in sequence. An example of the finite number of filters required can be illustrated for a practical voiceband data transmission case in which $f_c = 3000$ Hz and $T = 1/4800$-second, $r=5$ and $s=8$. There are eight 45° phases as shown in the vector diagram of FIG. 2, starting with a reference zero-degree phase vector 21 and continuing through the other phases such as 22. The digits at the end of the vectors indicate the sequence in which the vectors occur in evaluating equation (10) with consecutive values of $n$. The numbering indicates that succeeding vectors are five 45° phases apart, corresponding to $r=5$. It may further be noted that because $s$ is even, half of the vectors are negatives of the other half, i.e., they differ by 180°.

Figure 3:
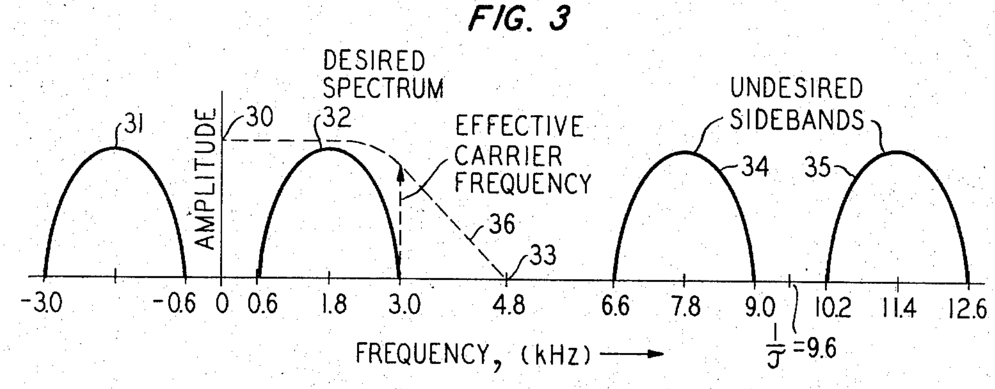
FIG. 3 is a frequency spectrum diagram useful in explaining this invention.

The amplitude of the transmitted spectrum for the preceding numerical example is shown in FIG. 3, whose ordinate along zero axis 30 is response amplitude and whose abscissa is frequency. The desired spectrum, shown in curve 32, extends from 600 to 3,000 Hz and can be viewed as a single sideband modulated on a 3,000-Hz carrier wave. Its analytical negative frequency counterpart is indicated by curve 31. Where a filter of transversal form is employed in a sampled-data system and is pulsed periodically, its transfer function is also periodic with a period $\tau$. Accordingly, additional sidebands harmonically related to the sampling rate of 9,600 Hz, such as is indicated by curve 34–35, are also generated. Inasmuch as the guard space between spectra 31–32 and 34–35 is large and centered about the 4,800-Hz frequency point 33, a simple resistance-capacitance low-pass filter, having the spectrum 36, can be used to reject the undesired sidebands 34-35.

Figure 4:
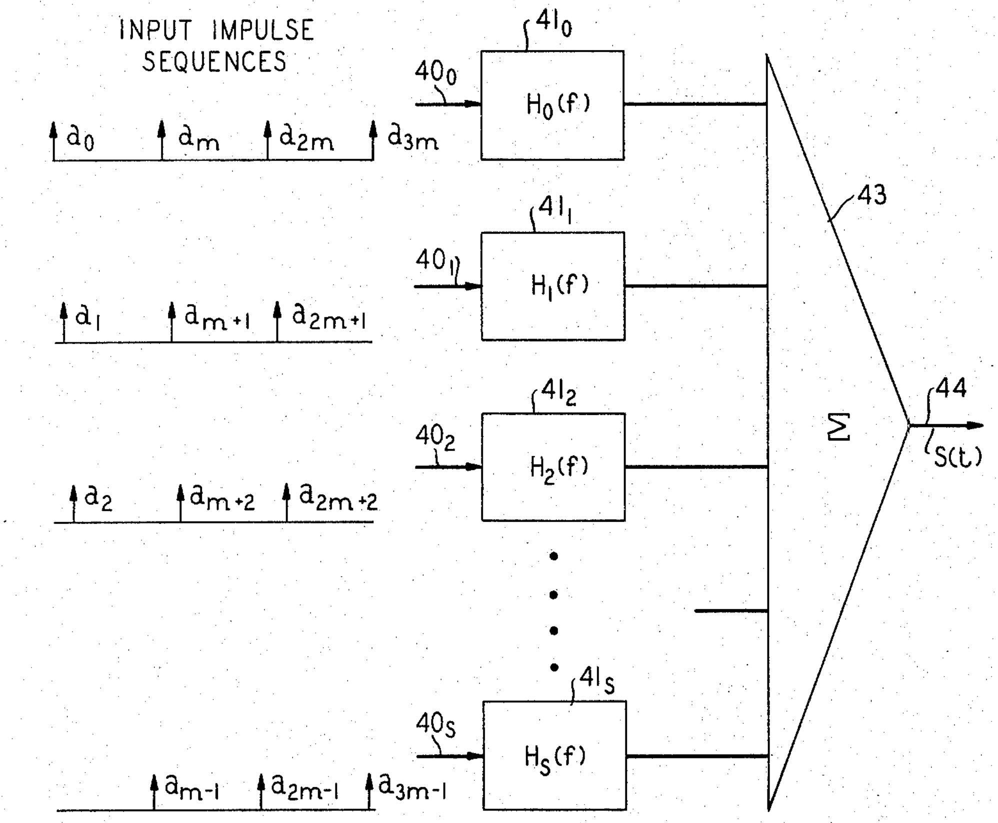
FIG. 4 is a block diagram of a finite parallel array of fixed filters required to produce a single-sideband data channel signal when the ratio between the effective carrier frequency and data transmission rate is a rational fraction in accordance with this invention.

FIG. 4 is a modification of the block diagram of FIG. 1 in which the number of filters 41 required is made finite at the number $s$ in equation (9). In FIG. 4 inputs are applied to the respective filters 41 on leads 40 in rotation in accordance with the order of the subscript 0 through $s$ thereon. Input pulse sequences are diagrammed on the lines to the left of the input leads. On the assumption of eight discrete phases there are eight filters 41 and each group of eight data signals is applied to the inputs sequentially. For example, input pulses $a_0$ to $a_7$ are applied in sequence to input leads $\mathbf{40}_0$ through $\mathbf{40}_s$. Immediately thereafter the next group of eight data pulses $a_8$ through $a_{15}$ is applied to the input leads 40 in the same order. Filter outputs are combined in adder 43 to appear on output lead 44 as the line signal $s(t)$ previously defined.

Figure 2:
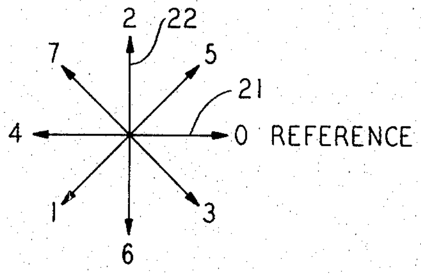
FIG. 2 is a vector diagram illustrating a group of discrete phase angles assumed by data channel signals generated in accordance with this invention.

In the illustrative eight-phase case the number of actual filters can be halved and the rotation of inputs divided between direct and inverted inputs in accordance with the vector diagram of FIG. 2.

In FIG. 4 the filters can be constructed in either frequency- or time-domain form, as will be apparent to one skilled in the filter art. A filter in frequency-domain form is constructed with discrete circuit elements, including resistors, capacitors and inductors. In this connection reference may be made to Chapters 6, 7 and 8 of *Reference Data for Radio Engineers* (Howard W. Sams and Co., Inc., Fifth Edition, 1968). Frequency-domain filters are also known in active form, using feedback amplifiers to eliminate inductors. A filter in time-domain form employs a tapped delay line in which the several tap outputs, derived from successive samples of a signal being processed, are selectively attenuated and combined to generate a single output. In this connection reference may be made to the paper by H. E. Kallman entitled "Transversal Filters" published in the *Proceedings of the Institute of Radio Engineers* (Volume 28, page 302, July 1940).

Figure 5:
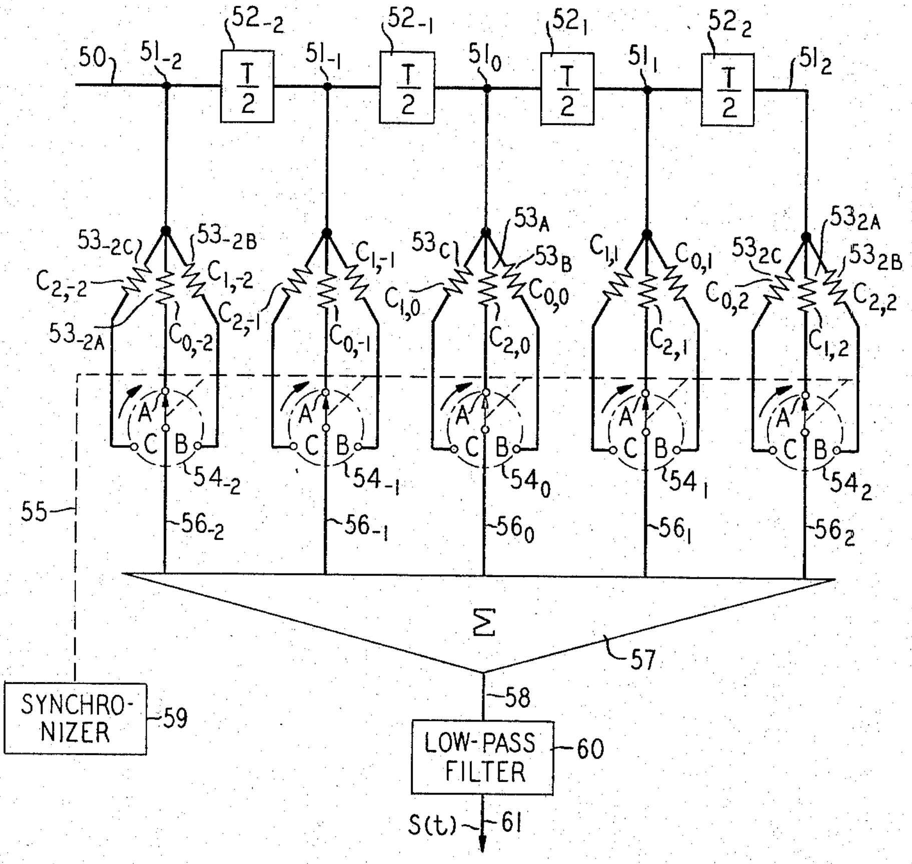
FIG. 5 is a block schematic diagram of a transversal filter with cyclically varied tap gain coefficients adapted to implement this invention.

As shown in FIG. 5 the functional equivalent of the inband signal generator of FIG. 4 can be implemented by a single time-domain transversal filter whose tap gain coefficients can be changed every data pulse interval in accordance with a stored program.

Ideally, a transversal filter should be of infinite length with taps spaced at intervals $$\tau = 1/f_0, \qquad (11)$$

where $f_0$ is at least twice the highest frequency in the spectrum to be synthesized.

Equation (6) can be expanded into a Fourier trigonometric series, the coefficients of whose sine and cosine terms define any desired waveform. Each set of coefficients thus determined can be used in a transversal equalizer structure as tap-gain coefficients or weights. The precision with which the desired waveform is reproduced is determined by the number of coefficients implemented. For most practical waveforms the coefficients of higher order terms tend to converge and therefore only a relatively small number of coefficients need be utilized. The transversal filter follows the same rule and therefore a finite number of taps generally suffices to reproduce the desired waveform within a practical mean-square error limit.

A transversal equalizer structure of the type shown in FIG. 5, but without the commutating arrangement, can be used with fixed tap attenuators to implement each block 41 in FIG. 4. The tap attenuator values are determined in accordance with the phase and amplitude responses required for the individual filter blocks.

Inasmuch as the delay element structure of the transversal equalizer is fixed and the particular waveform with a preselected phase is a function of the tap-gain coefficients, it is possible, as shown in equation (6), to calculate the appropriate sets of coefficients for each of the shaping filters $H_0(f)$ through $H_8(f)$ in FIG. 4 from the equality $$\sum_{m=-\infty}^{\infty} c_{nm} e^{-j2\pi mf/f_0} = Hn(f)$$

$$= e^{j2\pi n f_c T} G(f-f_c) + e^{-j2\pi n f_c T} G(f+f_c), \qquad (12)$$

where $c_{nm}$ = tap weight at the $m$th tap for the $n$th shaping filter.

Equation (12) can be solved for the tap weights $c_{nm}$ in an obvious manner.

Then, each set of tap weights calculated by the use of equation (12) can be implemented by resistors connected to the several taps on a transversal equalizer as shown in FIG. 5. The respective tap gains are then cyclically connected to a summation circuit.

In FIG. 5 data impulses applied to input lead 50 travel down a delay line having delay elements 52, four of which are explicitly shown as elements $\mathbf{52_{-2}}$, $\mathbf{52_{-1}}$, $\mathbf{52_{+1}}$ and $\mathbf{52_{+2}}$, separated by taps 51. At each tap, five of which are shown as taps $\mathbf{51_{-2}}$ through $\mathbf{51_0}$ to $\mathbf{51_{-2}}$, a plurality of fixed weighting resistors 53 is connected in order to attenuate signals incident at these taps. Reference tap $\mathbf{51_0}$, by way of example, has connected to it three weighting resistors $\mathbf{53_A}$, $\mathbf{53_B}$, $\mathbf{53_C}$. Each of the several weighting resistors 53 is in turn cyclically connected through a rotary switch 54, each of which has three armature contact positions lettered A, B and C, and a lead 56 to a combining circuit 57 and output conductor 58. Synchronizer 59 drives the armatures of the several switches 54 by way of mechanical link 55 shown as a broken line. This mechanical link is conceptual only; in practice tap weights can be switched electronically.

Delay elements 52 are indicated to have a uniform delay of $\tau = T/2$ second, i.e., half the signaling rate. This is done to ensure effectively two samples for each signaling interval. It is to be understood that while increasing the total number of taps on a transversal filter increases the precision with which the desired output waveforms are reproduced, increasing the number of taps per signaling interval T is equivalent to increasing the sampling rate thereby increasing the separation between sidebands as illustrated in FIG. 3. A simple low-pass filter 60 separates the desired and undesired spectral components appearing on conductor 58. The desired signal s(t) appears at the output of low-pass filter 60 on lead 61.

Weighting resistors 53 are further designated by the letter $c$ (for coefficient) with coordinate subscripts, the leftmost subscript indicating the order of the waveform according to its phase in each cyclic group and the rightmost subscript indicating the tap at which it is effective. Thus, the tap weights can be arranged in the form of a matrix in which the respective subscripts represent row and column positions. For the simplified five-tap example of FIG. 5 the matrix appears as follows:

$$\begin{bmatrix} c_{0,-2} & c_{0,-1} & c_{0,0} & c_{0,1} & c_{0,2} \\ c_{1,-2} & c_{1,-1} & c_{1,0} & c_{1,1} & c_{1,2} \\ c_{2,-2} & c_{2,-1} & c_{2,0} & c_{2,1} & c_{2,2} \end{bmatrix} \qquad (13)$$

Each row in matrix (13) represents the set of coefficients or weights determinative of a particular waveform. Row 1 on top, for example, defines the coefficients of the zero-phase waveform, Row 2 in the middle defines a waveform shifted in phase by 120°, and so forth.

It is to be realized, of course, that the data pulses are moving along the delay line. In order to have the correct set of weights applied to each data pulse and to take into account the cyclic rotation of tap weights, at the data transmission rate 1/T, matrix (13) is rearranged in accordance with the following Table I:

TABLE I

| Sampling times | Contact of switch 54 | Tap positions −2 | −1 | 0 | 1 | 2 |
|---|---|---|---|---|---|---|
| 0, $T/2$ | $A$ | $c_{0,-2}$ | $c_{0,-1}$ | $c_{2,0}$ | $c_{2,1}$ | $c_{1,2}$ |
| $T$, $3T/2$ | $B$ | $c_{1,-2}$ | $c_{1,-1}$ | $c_{0,0}$ | $c_{0,1}$ | $c_{2,2}$ |
| $2T$, $5T/2$ | $C$ | $c_{2,-2}$ | $c_{2,-1}$ | $c_{1,0}$ | $c_{1,1}$ | $c_{0,2}$ |
| $3T$, $7T/2$ | $A$ | $c_{0,-2}$ | $c_{0,-1}$ | $c_{2,0}$ | $c_{2,1}$ | $c_{1,2}$ |
| . | . | . | . | . | . | . |
| . | . | . | . | . | . | . |
| . | . | . | . | . | . | . |

Table I makes it apparent that as switches 54 are advanced at T-second intervals in alphabetical order between contacts A, B, C, A, B, C, etc., individual data pulses are operated on by their correct set of weights. Thus, the zeroth pulse is operated on by weights $c_{0,-2}$ and $c_{0,-1}$ at times 0 and T/2 while switch 54 is in position A. At time T switch 54 advances to position B where the zeroth pulse continues to be operated on by tap weights $c_{0,0}$ and $c_{0,1}$ at times T and 3T/2. The following pulse has now arrived at the delay line and is operated on by tap weights $c_{1,-2}$ and $c_{1,-1}$. Finally, at time 2T switch 54 advances to position C and the zeroth pulse is operated on by tap weight $c_{0,2}$. The first following pulse at the same time is being operated by tap weights $c_{1,0}$ and $c_{1,1}$. At second following pulse has now reached the delay line to be operated on by tap weights $c_{2,-2}$ and $c_{2,-1}$. The horizontal and diagonal lines in Table I show the path taken by the zeroth pulse through its set of tap coefficients. It is to be noted that rows 1 and 4 are identical, thus showing that the sequence of operations is cyclic.

It will be apparent to one skilled in the art that the transversal filter arrangement with cyclically selected tap weights shown in FIG. 5 can be expanded to as many types as desired. Practical considerations suggest the use of 25 to 35 taps. Since the data input pulses are binary in nature the delay elements can readily be implemented with shift register stages (the so-called binary transversal filter) which in turn are available in compact integrated circuit form.

While this invention has been disclosed in terms of specific illustrative embodiments, it will be understood by those skilled in the art to which it relates that its principles are subject to a wide range of modifications and implementations within the scope of the appended claims.

We claim:

1. Apparatus for generating passband transmission channel signals from a serial digital data source timed at a synchronous transmission rate comprising means for generating a plurality of impulse response functions having a common frequency bandwidth and absolute phase but differing initial phase, the ratio of the effective implicit carrier frequency to the synchronous transmission rate being a rational fraction, means for distributing consecutive digital data from said source cyclically to individual ones of said generating means, and means for combining the impulse response functions from said generating means into continuous channel signals with smooth transitions occuring at said synchronous transmission rate.

2. The apparatus defined in claim 1 in which each of said generating means comprises a plurality of frequency-domain bandpass filters.

3. The apparatus defined in claim 1 in which each of said generating means comprises a plurality of transversal filters each of which includes a tapped delay line, a summing circuit and a plurality of resistors weighted according to a predetermined wave shaping function interconnecting taps on said delay line with said combining circuit.

4. Apparatus for directly generating inband transmission channel signals having an effective carrier frequency $f_c$ from digital data occuring at the synchronous rate $f_s$, where the ratio $f_c/f_s$ is a rational fraction, comprising a transversal filter including a delay line with plural taps located at rational multiples of a synchronous interval $1/f_s$ and a combining circuit, a plurality of weighting resistors connected at each tap on said filter, said resistors when grouped in preselected sets one of which is associated with each tap being determinative of a plurality of waveshaping functions lying in a frequency band including the frequency $f_c$ and differing from each other in initial phase only, and switching means for selectively connecting the preselected sets of weighting resistors to said combining circuit in cyclic rotation at the rate $f_s$ to generate a succession of phase-compatible waveforms from said digital data.

5. Apparatus as set forth in claim 4 in which the values of the resistors in each preselected set are the coefficients of terms in the Fourier mathematical series defining the desired inband waveforms.

6. The apparatus defined in claim 1 in which said combining means comprises a single transversal filter, a plurality of taps spaced along said filter at equal intervals defined by the reciprocal of said synchronous transmission rate, a summing circuit, and weighting means joining each of said taps to said summing circuit;

said weighting means further comprising a plurality of sets of resistors, each set corresponding to a predetermined initial phase of a desired impulse response function, and means for connecting the members of said plurality of sets of resistors in cyclic rotation at said synchronous transmission rate between said taps and said summing circuit.

* * * * *